United States Patent [19]

Vernia et al.

[11] Patent Number: 4,921,551

[45] Date of Patent: May 1, 1990

[54] PERMANENT MAGNET MANUFACTURE FROM VERY LOW COERCIVITY CRYSTALLINE RARE EARTH-TRANSITION METAL-BORON ALLOY

[75] Inventors: Peter Vernia, Rochester; Robert W. Lee, Troy, both of Mich.

[73] Assignee: General Motors Corporation, Detroit, Mich.

[21] Appl. No.: 246,953

[22] Filed: Sep. 19, 1988

Related U.S. Application Data

[63] Continuation of Ser. No. 823,785, Jan. 29, 1986, abandoned.

[51] Int. Cl.$^5$ ............................................... H01F 1/02
[52] U.S. Cl. ..................................... 148/101; 148/104; 148/120; 419/12; 419/23
[58] Field of Search ............... 148/101, 103, 104, 105, 148/120; 419/10, 12, 23, 31, 33, 48, 49, 50

[56] References Cited

U.S. PATENT DOCUMENTS

| | | | |
|---|---|---|---|
| 2,689,398 | 9/1954 | Gaut et al. | 148/4 |
| 4,597,938 | 7/1986 | Matsuura et al. | 419/23 |
| 4,601,875 | 7/1986 | Yamamoto et al. | 419/23 |

FOREIGN PATENT DOCUMENTS

| | | |
|---|---|---|
| 0101552 | 2/1984 | European Pat. Off. . |
| 0126802 | 12/1984 | European Pat. Off. . |
| 0133758 | 3/1985 | European Pat. Off. . |
| 0144112 | 6/1985 | European Pat. Off. . |
| 57-141901 | 9/1982 | Japan . |
| 59-229461 | 12/1984 | Japan . |
| 60-162750 | 8/1985 | Japan . |
| 61-10208 | 1/1986 | Japan . |

OTHER PUBLICATIONS

Stadelmaier et al., "The Metallurgy of the Iron-Neodymium-Boron Permanent Magnet System", Materials Letters, vol. 2, No. 5A, Jun. 1984, pp. 411-415.

Lee, "Hot Pressed Neodymium-Iron-Boron Magnets", Appl. Phys. Lett., 46(8), Apr. 15, 1985, pp. 790-791.

Primary Examiner—John P. Sheehan
Attorney, Agent, or Firm—Elizabeth F. Harasek

[57] ABSTRACT

A method is disclosed of hot working a magnetically soft cast crystalline material containing grains of $RE_2TM_{14}B$ and an RE metal, rich intergranular second phase into anisotropic permanent magnet bodies.

9 Claims, 4 Drawing Sheets

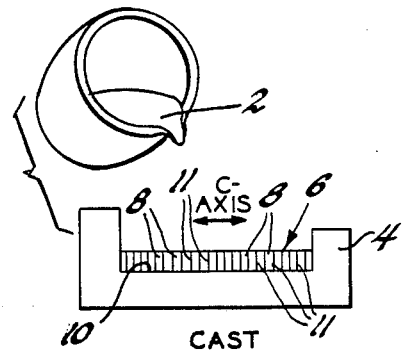
CAST
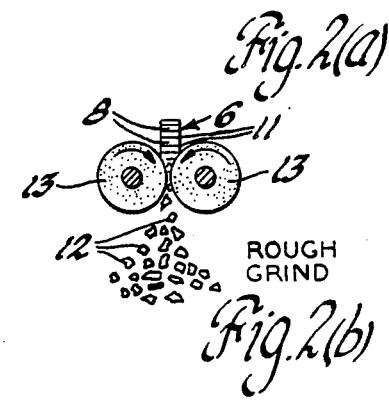
Fig. 2(a)
ROUGH GRIND
Fig. 2(b)
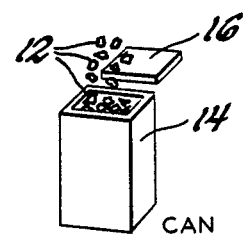
CAN
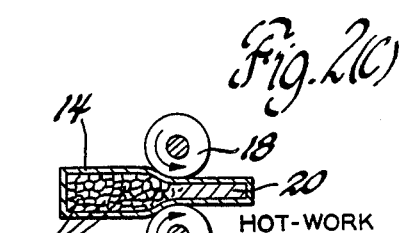
HOT-WORK
Fig. 2(c)
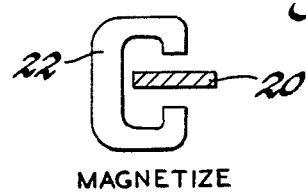
MAGNETIZE
Fig. 2(d)
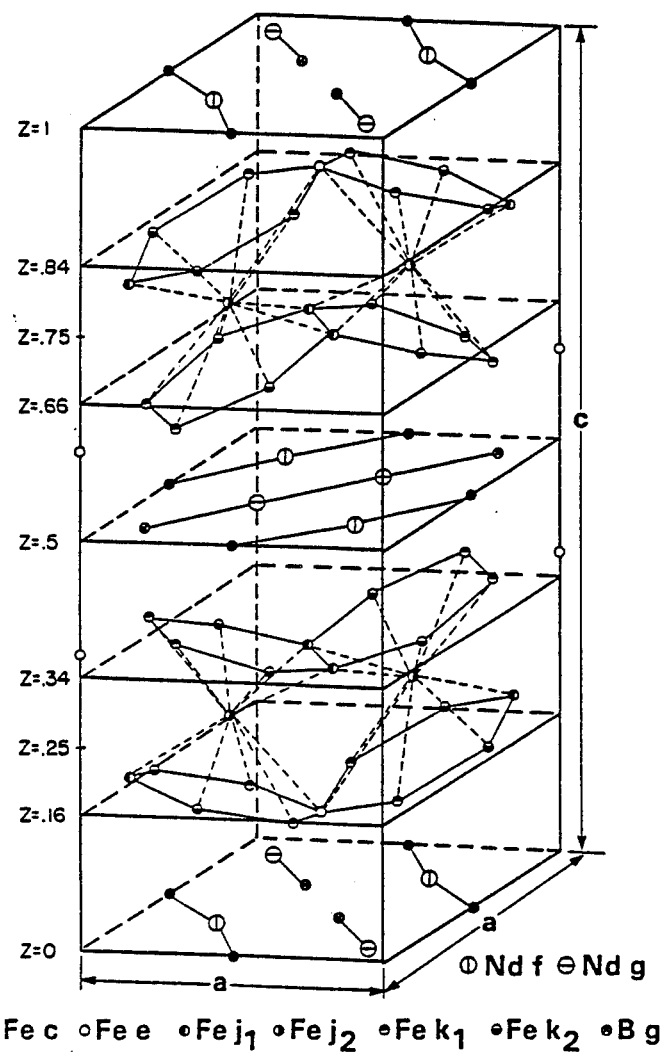
● Fe c   ○ Fe e   ● Fe $j_1$   ○ Fe $j_2$   ● Fe $k_1$   ● Fe $k_2$   ● B g
⊕ Nd f   ⊖ Nd g
Fig. 1
Fig. 2(e)

PERMANENT MAGNET MANUFACTURE FROM VERY LOW COERCIVITY CRYSTALLINE RARE EARTH-TRANSITION METAL-BORON ALLOY

This is a continuation of application Ser. No. 823,785 filed on Jan. 29, 1986, now abandoned.

This invention relates to a method of making high coercivity, high energy product magnets from fully crystalline alloys containing one or more light rare earth (RE) elements, one or more transition metals (TM) and boron which alloys are not permanently magnetic as cast. The invention relates particularly to the manufacture of strong permanent magnets by hot-working large particles or billets of non-permanently magnetic, crystalline, cast alloys consisting predominantly of a $RE_2TM_{14}B$ phase where the TM includes iron.

BACKGROUND

The invention of high coercivity, high energy product light rare earth-iron (RE-Fe) based permanent magnets is the subject matter of U.S. Pat. No. 4,496,395 issued Jan. 29, 1985 and U.S. Ser. Nos. 414,936 filed Sept. 3, 1982; 508,266 filed June 24, 1982; and 544,728 filed Oct. 26, 1983, all to Croat and assigned to General Motors Corporation. The preferred magnet compositions are based on the rare earth elements neodymium or praseodymium or both, the transition metal iron or mixtures of iron and cobalt, and boron. The preferred compositions contain a large proportion of a $RE_2TM_{14}B$ phase where TM is one or more transition metal elements including iron.

The preferred method of processing such alloys, as disclosed in the above noted patent and patent applications, involves rapidly solidifying molten alloy to achieve a substantially amorphous to very finely crystalline microstructure that has isotropic, permanently magnetic properties. It is believed that the crystallographic ordering range in the highest energy product alloys is commensurate with optimum single magnetic domain size. Overquenched alloys can be annealed at suitable temperatures to cause grain growth and thereby induce magnetic coercivity. The maximum magnetic energy product to date for an as-quenched Nd-Fe-B based alloy is about 15 megaGaussOersted.

U.S. Ser. No. 520,170 to Lee filed Aug. 4, 1983, now abandoned and also assigned to General Motors Corporation, relates to a method of introducing anisotropic magnetic properties in rapidly solidified RE-Fe-B based alloys by hot-working. Alloys with overquenched, substantially amorphous microstructures are worked at elevated temperatures to cause grain growth and crystallite orientation which result in substantially higher energy products than in the best as-rapidly-solidified alloys. The maximum energy product to date for hot-worked, melt-spun Nd-Fe-B alloy is about 45 mGOe, although energy products as high as 64 mGOe are theoretically possible.

It is also known that high coercivities and energy products can be induced in light RE-Fe-B based alloys by the conventional orient-press-sinter (OPS) method which has been used for more than twenty years to make samarium cobalt and other rare earth cobalt permanent magnets. This method has severe commercial limitations because it entails many processing steps which must be carried out in a controlled, non-oxidizing atmosphere. High coercivities and energy products (greater than 10 mGOe) are obtained only by grinding crystalline alloys into very fine (less than 5 micron) powder, magnetically aligning and compacting the powder in a strong magnetic field, and sintering the compacts. Magnets made by the OPS process are brittle and generally require a substantial amount of finish grinding to achieve any but the simplest small shapes.

It is also known that by substituting copper for some of the cobalt in $RECo_5$ and $RE_2Co_{17}$ compositions, coercivity can be induced in as-cast alloys by suitable heat treatment between 400 and 500° C. The coercivity is believed to be caused by a domain wall pinning phenomenon. Analogous precipitation hardening of cast RE-Fe-B based compositions has not been achieved to date and the presence of copper in more than trace amounts has been found to drastically reduce the energy product of RE-Fe-B based alloys. It is also well known that certain as-cast Cr-Co-Fe compositions which do not contain rare earth elements can be uniaxially worked at cold temperatures to achieve energy products up to about 5 mGOe.

While the rapid solidification and hot-working of RE-Fe-B based compositions appears to be a more practical and less expensive process than OPS, it would also be desirable to have a means of making high coercivity, high energy product RE-Fe-B based permanent magnets without initial rapid solidification. By rapid solidification herein is meant solidification of an alloy initially at a temperature above its melting point at a cooling rate of about $10^5$° C. per minute or greater. That is, it would be advantageous to make permanent RE-Fe-B magnets from conventionally cast, fully crystalline alloys but without the fine grinding and aligning steps of the OPS process. Conventional casting results in cooling rates substantially lower than $10^5$° C. per minute. However, before this invention, no such method was known or had been suggested.

BRIEF SUMMARY

In accordance with a preferred practice of the invention, suitable proportions of one or more rare earth elements, one or more transition metals including iron, and boron are melted together in a crucible. The ratio of constituents should be chosen to result in a cast material consisting predominantly of $RE_2TM_{14}B$ grains with a RE-containing minor phase(s) present as a layer at the grain boundaries. It is particularly preferred that the $RE_2TM_{14}B$ grains be thin, flat platelets.

The preferred rare earth elements are Nd and Pr, and the preferred transition metal (TM) is iron or mixtures of iron and cobalt. $Nd_{16.5}Fe_{76.3}B_{7.2}$ is the nominal overall composition of one such preferred material. The minor second phase(s) of this alloy is relatively neodymium and boron rich.

The molten metal is cast onto a chill block or into a chill mold of highly heat conductive material. The chill rate is orders of magnitude slower than the chill rate of melt-spinning or other rapid solidification processes. For a 6–12 mm thick cast billet, cooling on a relatively thick chill block results in platelet-shaped crystals with a smallest dimension of at least about 5 microns and generally not greater than about 50 microns. The crystallographic c-axis of each platelet is perpendicular to its major flat surfaces. In the smallest dimension, these single crystal platelets are larger than the maximum size of ground particles useful in the OPS process.

The platelets, in turn, align flat-surface to flat-surface in lamellar regions comprised of several (as few as 4 or as many as 30 or more) in a group, all oriented with smallest dimension (thickness of platelets) perpendicular to the chill direction. These lamellar regions, hereafter called "packets", have a long range order from about 50 to several hundred microns in the smallest dimension to the overall thickness of the chill cast ingot in the largest dimension. The orientation of the platelets is caused by directional cooling from the chill surface on which they are cast. The crystallographic c-axes of the platelets lie parallel to the chill surface. The preferred direction for magnetic alignment of $RE_2TM_{14}B$ crystal is along the c-axis. The coercivity of this cast material is very low—less than 500 Oe if detectable at all.

In one preferred method, the cast alloy may be crudely broken up into particles averaging between about 50 and 600 microns average dimension. The billet fractures preferentially at the boundaries between packets so that each particle is primarily made up of a single packet. Thus, there is substantially uniform crystallographic orientation in each particle.

The particles may be precompacted to about 80 percent density in a conventional cold press or may be poured into a compacting vessel or can without precompaction. The can is preferably made of an easily deformable metal such as dead soft iron or copper. Once the particles are in the can, it is sealed.

The can and contents are then heated to a temperature above the melting point of the second phase. Typically, temperatures above 650° C. and below 800° C. are suitable. In the case of the treatment of the $Nd_{16.5}Fe_{76.3}B_{7.2}$ composition, a temperature of 730°±30° C. is preferred. Once the material is at temperature, it is deformed to cause suitable hot-working which introduces coercivity and increased magnetic alignment in the material. The hot-working causes the initially magnetically soft alloy to develop good permanent magnetic properties including coercivities of several thousand Oersteds and remanence of several thousand Gauss and energy products over 10 mGOe.

In another preferred practice, molten RE-Fe-B metal is cast to result in directionally solidified alloy which may be cut into suitably sized and shaped pieces for further processing without grinding or containing the sample in a can. Directionally solidified samples are preferably hot-worked in a non-oxidizing atmosphere at a temperature of about 730±30° C. in a direction parallel to the crystallographic c-axis of the alloy; i.e., in a direction transverse to the direction of cooling.

Another processing method involves cutting an alloy sample from a cast billet having partially oriented platelets (i.e., not fully directionally solidified) and hot-working it as described for directionally solidified alloy.

The practice and scope of the subject invention will be better understood in view of the figures and detailed description which follows.

FIG. 1 is an exploded view of a crystal of $Nd_2Fe_{14}B$.

FIG. 2 is a diagrammatic flow chart for a preferred method of hot-working fully crystalline RE-Fe-B alloy to obtain a permanent magnet.

Figure 4:
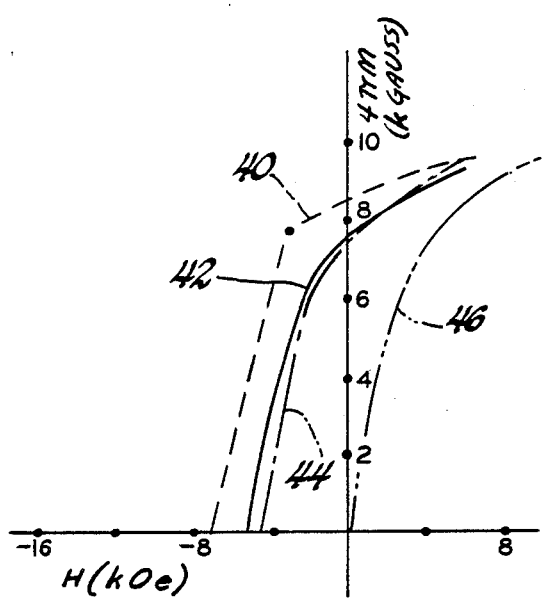
Figure 5:
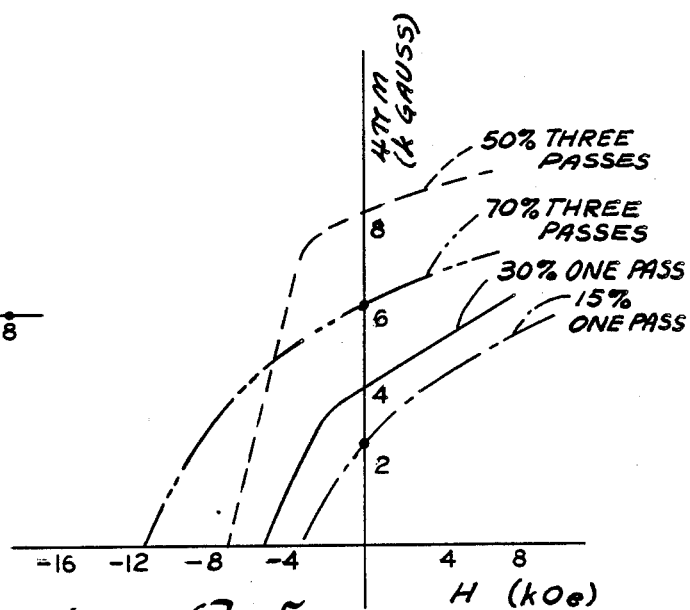
Figure 6:
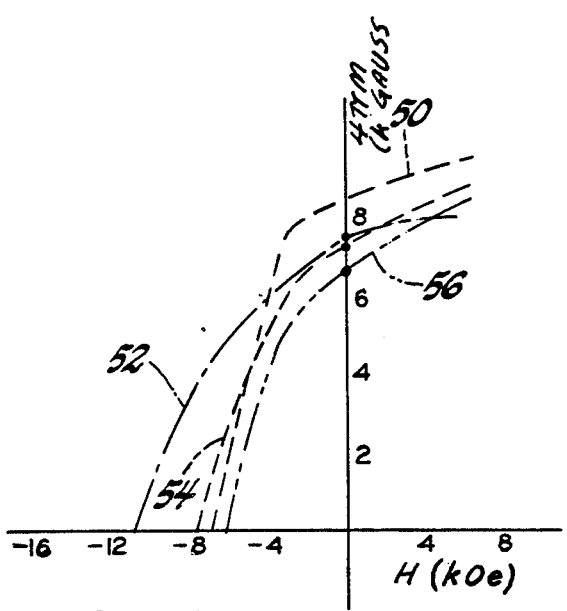
Figure 7:
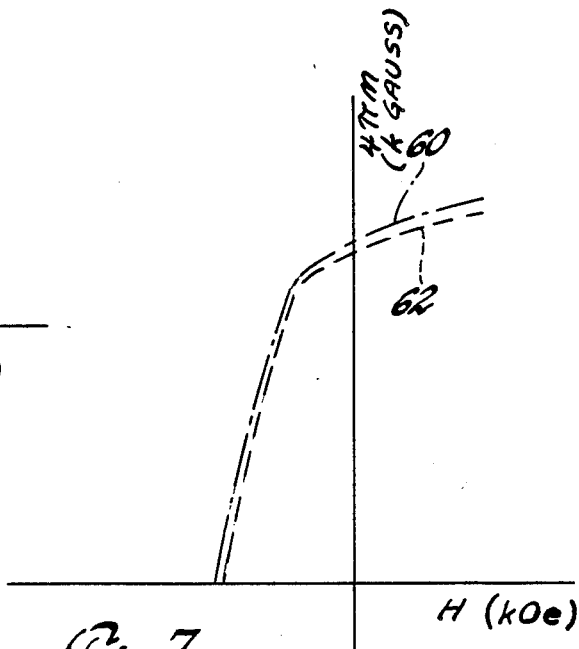

FIGS. 4–7 are second quadrant demagnetization curves for crystalline Nd-Fe-B alloy samples that were canned, heated and then hot rolled. FIG. 4 shows the effect of hot-working temperature; FIG. 5 shows the effect of thickness reduction; FIG. 6 shows the effect of different forms of precursor alloy; and FIG. 7 shows the effect of hot-working a sample in two different mutually perpendicular directions.

FIG. 8 is a diagrammatic flow chart for hot-working fully crystalline, directionally solidified or partially directionally solidified alloy to obtain a permanent magnet.

Figure 9:
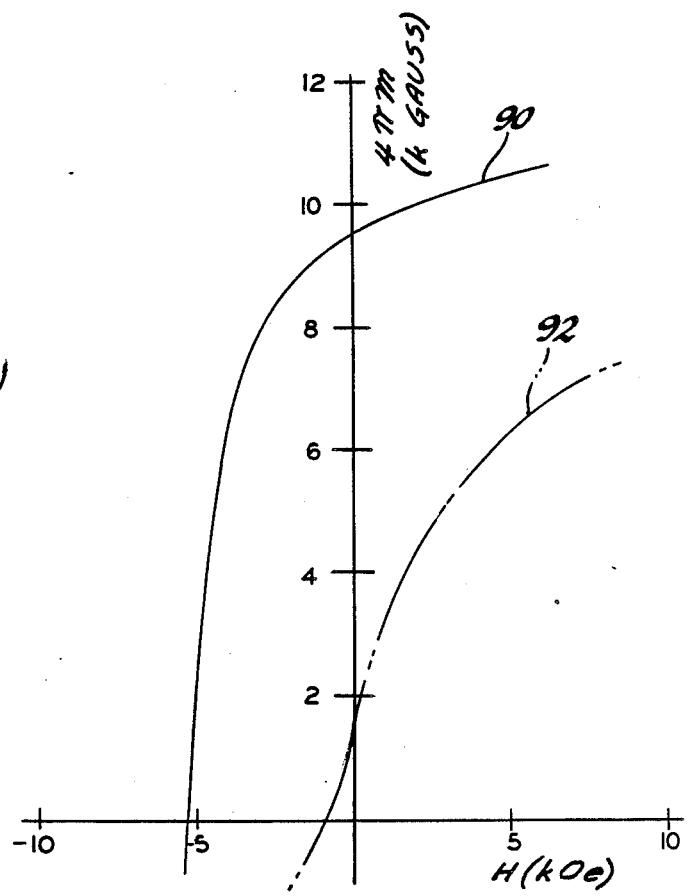

FIG. 9 shows second quadrant demagnetization curves for crystalline Nd-Fe-B alloy billet samples hot-worked perpendicular to the chill direction of the billet in a punch and die in a vacuum press.

DETAILED DESCRIPTION

In accordance with a preferred practice of the invention, rare earth-transition metal-boron (RE-TM-B) alloys belonging to the family of compositions particularly disclosed and claimed in U.S. Ser. Nos. 414,936; 508,266; and 544,728 (referenced above and incorporated herein by reference) are particularly useful in the practice of the subject invention.

The transition metal component is iron or iron and one or more of cobalt, nickel, chromium or manganese. Cobalt is interchangeable with the iron up to about 40 atomic percent to maintain high energy product alloys. Chromium, manganese and nickel are interchangeable in lower amounts, preferably less than about 10 atomic percent. Small amounts of zirconium, titanium, silicon and carbon may be added to tailor the shape of the second quadrant demagnetization curves. The composition preferably comprises at least about 50 atomic percent iron based on the total alloy composition.

The composition also comprises at least about 10 and preferably about 13 to 30 atomic percent rare earth component. Neodymium and/or praseodymium are preferred rare earths and may be used interchangeably. Smaller amounts of other rare earth elements, such as samarium, lanthanum and cerium, may be mixed with neodymium and praseodymium without substantial loss of the desirable magnetic properties. Small amounts of heavy rare earth elements such as terbium and dysprosium may be added to increase coercivity. Preferably rare earth elements other than Nd and/or Pr make up no more than about 40 atomic percent of the rare earth component. Preferably, enough rare earth should be contained in the alloy to provide rare earth in the secondary phase in a proportion greater than it is present in the predominant $RE_2TM_{14}B$ phase.

The composition preferably contains at least 0.5 and preferably about 6 to 10 atomic percent boron.

The predominant magnetic phase of the subject alloys is $RE_2TM_{14}B$ where the TM is predominantly Fe which phase has a tetragonal crystal structure with room temperature lattice constants of a=8.78 angstroms and c=12.18 angstroms. $Re_2Fe_{14}B$ crystals have been indexed to the $P4_2/mnm$ space group of the *International Tables for X-Ray Crystallography*, N. Henry et al., ed., Kynoch, Birmingham, England (1952). An exploded view of a $Nd_2Fe_{14}B$ crystal showing the crystallographic a and c axes is shown in FIG. 1. The following table summarizes the symmetry sites and positions for a unit cell $Nd_8Fe_{56}B_4$ of the $Nd_2Fe_{14}B$ phase shown in FIG. 1.

| Atom | Occupancy | Symmetry Position | Coordinates | | |
|---|---|---|---|---|---|
| | | | x | y | z |
| Nd | 4 | f | 0.273 | 0.273 | 0.0 |
| Nd | 4 | g | 0.128 | −0.128 | 0.0 |
| Fe | 16 | $k_1$ | 0.227 | 0.564 | 0.870 |

| Atom | Occupancy | Symmetry Position | Coordinates x | y | z |
|---|---|---|---|---|---|
| Fe | 16 | $k_2$ | 0.036 | 0.356 | 0.175 |
| Fe | 8 | $j_1$ | 0.099 | 0.099 | 0.203 |
| Fe | 8 | $j_2$ | 0.686 | 0.686 | 0.751 |
| Fe | 4 | e | 0.0 | 0.0 | 0.391 |
| Fe | 4 | c | 0.0 | 0.5 | 0.0 |
| B | 4 | g | 0.364 | −0.364 | 0.0 |

The formulas $RE_2TM_{14}B$ and $RE_2Fe_{14}B$ as used herein include all compositions having the tetragonal crystal structure above including small amounts of any other elements such as Si, C, Ca, Sr, Mg, etc. so long as these other elements do not destroy the 2-14-1 crystal phase.

About 10 volume percent or less of the alloy preferably consists of one or more minor rare earth-rich phases. We have tentatively identified $Fe_4B_4Nd$ as one such phase. Another phase which is probably close in composition to the rare earth-iron eutectic is also believed to be present. At least one of the secondary phases has a lower melting temperature than the predominant phase.

For purposes of illustration, our invention will be described using compositions of approximately the following atomic proportions:

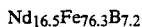

$Nd_{16.5}Fe_{76.3}B_{7.2}$

However, it is to be understood that our method is applicable to other compositions as described above.

In the past, achievement of high energy (greater than 10 mGOe) product RE-Fe-B magnets depended critically on the submicron crystallite size of rapidly solidified alloy or the less than five micron particle size of ground alloy powder in the OPS method.

U.S. Ser. No. 520,170 to Lee relates to hot-working substantially amorphous to very finely crystalline alloys to arrive at alloys with fine grain microstructures where the grains have a maximum dimension of about 50 to 500 nanometers (0.05 to 0.5 microns).

The OPS process generally starts with fully crystalline alloy, but requires that the alloy be ground to a powder size no greater than about 5 microns. Such fine powders must be processed away from any oxygen to prevent degradation of magnetic properties and spontaneous combustion. The powder must then be magnetically aligned in an externally applied field, pressed and sintered.

The subject invention starts with fully crystalline alloy with primary phase grains of elongated platelet shape. The platelet's shortest average dimension is at least about 5 micrometers—comparable to the maximum OPS ground powder size. The crystallographic c-axes of the platelets is along the shortest dimension; i.e., transverse to the platelet faces. In chill cast alloys, the platelets form as lamellar regions with platelet faces parallel. Thus the c-axes of the individual platelets are also parallel; and an entire lamellar region, or packet, is characterized by a single c-axis direction which is parallel to the chill surface and transverse to the direction of cooling. The terms "platelet", "grain", and "crystal" may be used interchangeably herein.

In accordance with this invention the crystalline alloy may initially be coarsely attrited to break the aggregate platelet packets apart. This results in relatively large particles averaging about 200 to 600 microns across with very few fines under 50 microns. These particles do not combust spontaneously in air. Alternatively, chunks of alloy can simply be cut from a chilled billet and hot-pressed directly.

FIG. 2 is a schematic representation for a preferred embodiment of the practice of this invention. The first step shown in FIG. 2(a) entails casting a molten RE-Fe-B alloy 2 into chill mold 4 to form a layer of alloy 6 that is preferably at least 1 mm thick. This causes large platelets 8 to form in the cooled alloy which are parallel to one another over regions of a few platelets up to several hundred platelets. Boundaries 11 between platelets 8 are shown larger than scale for purposes of illustration. The crystallographic c-axes are parallel to primary chill surface 10 as shown by the arrows.

Platelets 8 consist essentially of a crystalline $RE_2TM_{14}B$ phase where the RE is predominantly Nd and/or Pr and the TM is predominantly Fe. An average platelet formed by casting molten alloy into a room temperature steel mold would be about 10-30 microns by about 50-100 microns by the thickness of the alloy layer.

Figure 3:
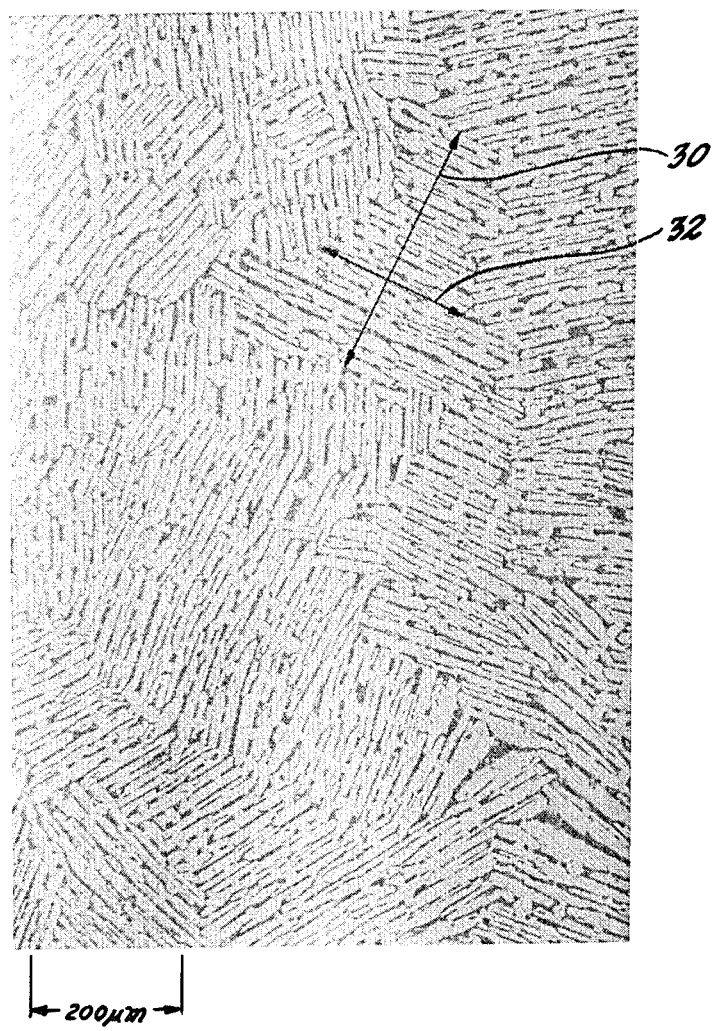
FIG. 3 is an optical micrograph of $Nd_{16.5}Fe_{76.3}B_{7.2}$ alloy cast into a steel chill mold.

FIG. 3 is an optical micrograph looking down at the polished top surface (i.e., opposite the face of the ingot against the primary chill surface of the steel chill mold) of a $Nd_{16.5}Fe_{76.3}B_{7.2}$ alloy ingot about 0.64 cm thick. The average smallest platelet dimension is about 10 microns across. In contrast, a melt-spun, rapidly solidified alloy of like composition has grains which are less than about 50 nanometers across. Such tiny grains cannot be seen using optical micrographic techniques. The small crystallite size of melt spun alloy is the result of cooling at a rate generally at least about 1000 times faster than the rate at which an alloy cools in a steel chill mold.

It is also apparent from the micrograph that the platelets or grains form packets of similarly aligned platelets. The regions may extend 100 microns or more across (arrow 32) and are generally many platelet layers thick as indicated by arrow 30. A much smaller amount of a second phase indicated by the dark regions on the micrograph forms around the $RE_2TM_{14}B$ grains. Electron microprobe analysis indicates that this phase is RE-rich compared to the predominant 2-14-1 phase and has a composition near the Re-Fe eutectic. The minor phases(s) has (have) a lower melting point than the $RE_2TM_{14}B$ phase.

FIG. 2(b) shows particles 12 formed by roughly grinding chill cast alloy 6. The alloy 6 fractures preferentially at the boundaries of the packets or at the boundaries 11 between grains 8. Any suitable attriting equipment may be used to rough grind the billet although care should be taken to avoid excessive moisture or heat which can cause oxidation of the particles. FIG. 2(b) shows fracture of alloy 6 between crusher rollers 13. The preferred particle size range is greater than about 50 microns and less than about 600 microns average diameter. We have found that grinding the alloy in a jaw and roller crusher (not shown) results in fairly uniformly sized particles over a normally distributed particle size range. The crushing process produced few fines smaller than 50 microns.

FIG. 2(c) shows dispensing particles 12 in a soft iron can 14 or other suitable airtight container preparatory to hot-working. Particles 12 may be compacted to about 80 percent density in an ordinary cold press either before or after insertion in the can, if desired, but they may also be loosely packed in can 14. Can 14 is preferably made of a soft, deformable metal which does not degrade the magnetic properties of the alloy. Soft steel and copper have been found to be suitable although other malleable materials may be used which are not adversely affected at elevated hot-working temperatures. After particles 12 are in can 14, it is sealed with a cover 16 or simply pinched closed or welded shut to prevent any significant oxidation of the contained alloy as it is hot-worked.

Unless otherwise noted, the cans used for the examples set forth below were soft steel blocks about 10 cm long, 5.7 cm wide and 1.9 cm thick. A slot about 7.5 cm deep, 3.2 cm wide and 1.3 cm thick was machined into the block. A precompact (about 80 percent dense) of roughly ground particles about 6.4 cm long, 3.1 cm wide and 1.25 cm thick was placed in the slot and a plug was welded in place. It did not seem to matter whether or not the slot was evacuated before the plug was sealed. We believe that much thinner walled cans can be used. For example, powder could be continuously disposed in thin copper tubes which could be heated quickly, rolled to reduce thickness and cut, hot stamped or otherwise suitably fabricated into magnet shapes.

The hot-working step of FIG. 2(d) entails elevating the temperature of the workpiece to above about 650° C., preferably about 730° C.±30° C. in the case of the $Nd_{16.5}Fe_{76.3}B_{7.2}$ alloy. This temperature is above the melting point of the minor phase(s) that form as a layer between the $RE_2TM_{14}B$ grains. Such temperature will vary depending upon composition. At this temperature, suitable hot working produces magnetic coercivity in the workpiece.

Referring to FIG. 2(d), the preferred method of hot-working particles 12 in can 14 is to preheat them to about 740° C. and pass them through calender rollers 18 to effect a reduction in thickness of the material in the can 14 by about 30 percent to 70 percent after correcting for full densification of the material. The reduction may take place in one pass or several although the integrity of densified compact 20 which results seems to be better with a single pass. Rollers 18 may or may not be heated although it may be necessary to heat the workpiece between passes if they are not.

During this rolling, the large, flat grains of $RE_2TM_{14}B$ in the hot material are caused to move such that their C-axes become aligned perpendicular to the rolling plane. This introduces magnetic alignment perpendicular to the rolling plane. However, the critical aspect of such hot working is that it introduces coercivity into the material.

As shown in FIG. 2(e), after the hot-worked alloy compact 20 is cooled below its Curie temperature, it can be magnetized in a suitable magnetizer 22. If the can is magnetic as in the case of iron or steel, it should be removed from the compact before the magnetizing step. Otherwise, the can may be left in place.

Neither the alignment nor coercivity mechanism(s) produced by the subject method are completely understood at this time, but there are two physical changes which occur during hot-working which we believe are contributory: (1) the 2-14-1 platelets are fragmented which reduces particle size, increases surface area, and specifically exposes fresh surfaces not bounded by the Nd-rich phases which separate the platelets, and (2) the Nd-rich, low-melting, secondary phase eutectic mixtures flow at the hot-press temperatures and substantially coat or separate these individual fragmented particles of the 2-14-1 phase.

We believe that one or more of the physical changes induced by hot-working produces a favorable condition for domain wall trapping. In the large, as-cast, 2-14-1 grains there is ample volume for multiple magnetic domains which are easily reversed in a reverse magnetic field. The fact that the cast alloy has soft magnetic properties supports this. The subject hot-working method probably results in domain wall trapping, most likely at the 2-14-1/minor phase boundaries. Domain wall trapping promotes resistance to demagnetization and much higher coercivity.

EXAMPLE 1

About 1500 grams of an alloy with the nominal composition (in atomic percent) $Nd_{16.5}Fe_{76.3}B_{7.2}$ was heated in a vacuum furnace to about 150° C. above its melting temperature. The alloy was cast into a room temperature cylindrical solid steel mold (chill block) having an inside diameter of about 15.2 cm and a thickness at the bottom of 2.54 cm and a 6 mm thick lip about 2 cm high around the sides. The resultant ingot was about 1.27 cm thick. Because most of the heat was withdrawn through the thick bottom of the mold, the platelets formed in clusters or packets with their crystallographic c-axes substantially parallel to the surface of the chill plate as shown, for example, at FIG. 2(a). Each platelet had a generally ovoid, flat plate shape. The smallest average platelet dimension (i.e., its thickness) was about 30 microns and its longest about 1.27 cm, the thickness of the cast ingot.

The ingot was crushed in a jaw and roller crusher to a maximum particle size of about 600 microns, an average size of about 200 microns with a normal distribution of smaller sized particles. There were very few fines smaller than 50 microns. The crushed particles did not combust spontaneously in air and seemed to be fairly resistant to oxidation. Each particle contained a plurality of crystals. Each crystal contained a plurality of magnetic domains. No more than a few Oersteds coercivity could be induced in the particles at this stage of the process by application of a magnetic field. That is, the particles had magnetically soft properties.

The particles were precompacted to 80 percent density and inserted in a slot in a soft steel can as described above. The can and compact were heated in a resistance heated furnace to a temperature of about 740° C. The can was removed from the furnace and immediately passed through a pair of 22.2 cm diameter calender rollers originally at room temperature. The can lost about 30°-40° C. on each roll and was reheated to about 740° C. for subsequent rolling steps. The total time at temperature above about 700° C. for each sample was approximately 20 minutes.

After rolling of each sample was completed, the can was cut away and small samples were taken from the resultant block or compact of fully densified magnetic material. Some stress cracking appeared at the edges of samples subjected to multiple rolling steps. However, we believe the cracks can be eliminated by using better equipment and making minor processing adjustments.

An unworked "as-cast" control and the hot worked samples were magnetized in a 19 kOe magnetic field and the second quadrant demagnetization curves were measured in a Princeton Applied Research vibrating sample magnetometer at room temperature. Curve 46 in FIG. 4 is the demagnetization curve of the as-cast material. For each hot worked sample, the preferred direction of magnetization was transverse to the rolling plane (i.e., parallel to the direction in which the thickness of the canned sample was reduced).

FIG. 4 shows the effect of can temperature prior to each rolling step on the magnetic properties of hot-worked alloy. The thickness (after correction for full densification) of the alloy in the can was reduced from about 1.25 cm to 0.67 cm by rolling the can through the calender rollers three times, affecting about ⅓ of the total thickness reduction on each pass. The sample rolled after being heated to a temperature of 730°–740° C. (curve 40) had the highest remanence, coercivity and energy product. Rolling at 710° C. (curve 42) and 770° C. (curve 44) resulted in the creation of permanent magnetism in the samples but at lower values. Thus, hot-working may be carried out over a substantial elevated temperature range but about 740° C. appears to be optimum when working with cold rollers.

FIG. 5 shows the effect of the degree of deformation on magnetic properties for samples heated to about 740° C. before each pass. In the examples, deformation is shown as a percent reduction of the original thickness of the alloy sample, after correcting for densification. Even a small 15 percent reduction on a single pass through the rollers results in the creation of permanent magnetism in the sample. A 30 percent reduction on a single pass improves the magnetic remanence and coercivity. The highest remanence and squarest curve were obtained for a sample whose thickness was reduced 50 percent in three passes. A 70 percent reduction in three passes created higher coercivity but lower remanence. Thus, it appears that the shape of the second quadrant hysteresis curve can be tailored to some degree by making changes in the hot-working parameters.

FIG. 6 shows the effect of the condition of the precursor alloy on demagnetization of 1.25 cm thick alloy samples. Each corrected sample thickness was reduced by 50 percent in three passes when heated to about 740° C. before each pass. Curve 50 corresponds to a sample can initially containing particles having a minimum platelet dimension of about 30 microns comprising particles (consisting of a plurality of platelets) precompacted to 80 percent density.

Curve 52 represents a sample processed in like manner using an ingot having a finer grain microstructure where the average platelet thickness was about 10 microns rather than 30. This resulted in a higher coercivity than the coarser grain sample with a slightly reduced remanence.

Curve 54 shows the effect of reducing the full density thickness of the alloy by 50 percent in three passes where the particles (30 micron smallest grain dimension) were simply poured into the can and the plug tapped into place. The initial powder density was about 60 percent of theoretical density.

Curve 56 shows the effect of reducing the thickness of a block of alloy 3.2 cm wide by 2.5 cm long by 1.25 cm thick by 50 percent (30 micron smallest grain dimension). The block of ingot was encapsulated in a steel can and oriented so that the c-axes of the platelets were generally perpendicular to the rolling direction.

FIG. 7, Curve 60, shows that making the first of three hot-rolling passes in a direction perpendicular to the other two resulted in slightly better magnetic properties for a 50 percent thickness reduction than in a sample where all three passes are made in the same direction (Curve 62). All passes were made after heating or reheating the sample to about 740° C.

FIG. 8(a) to 8(d) show a diagrammatic flow chart for another preferred method of practicing the subject invention.

Figure 8A:
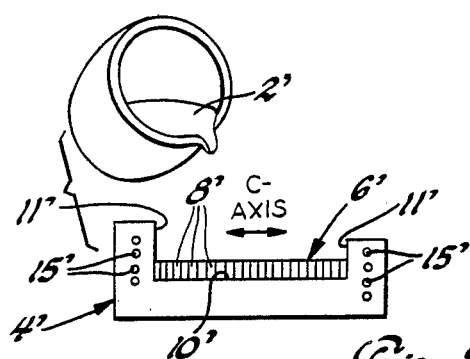

Molten alloy is either cast into a conventional chill mold as described above and shown in FIG. 2(a) or is directionally solidified to cause parallel alignment of all grains in the alloy. FIG. 8(a) shows one well known method for rapidly solidifying metals which entails pouring molten alloy 2' into a mold 4' which is chilled in the primary cooling direction through mold bottom 10' and heated in the transverse direction through mold side wall 11' by means of heating coils 15'. In the subject alloys, the c-axis of directionally solidified alloy 6' would be substantially parallel to the chill surface 10'.

Conventionally cast alloy has a high proportion of grains perpendicular to the chill direction but there are also some grain regions with other crystal orientations.

Figure 8D:
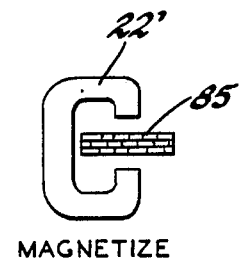
Figure 8B:
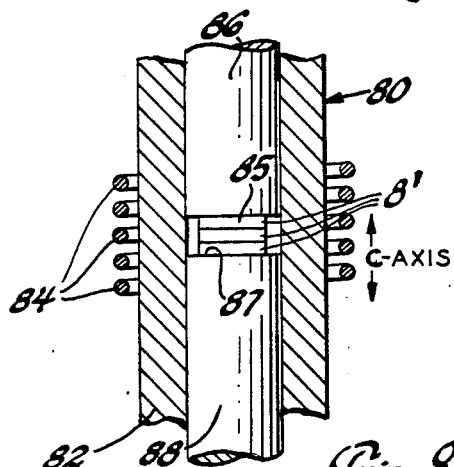

Referring to FIG. 8(b), the second step entails positioning directionally solidified segment(s) 85 of alloy 6' in hot-press 80 so that its crystallographic c-axes are oriented in the direction of pressing as indicated. A suitable hot-working apparatus consists of a conventional hot press having a steel die 82. Heating coils 84 surround die 82. The segment(s) 85 of several directionally solidified platelets of alloy 6' is shown resting on the top 87 of bottom punch 88. The crystallographic c-axis of the blocks is parallel to the direction of pressing as indicated.

Figure 8C:
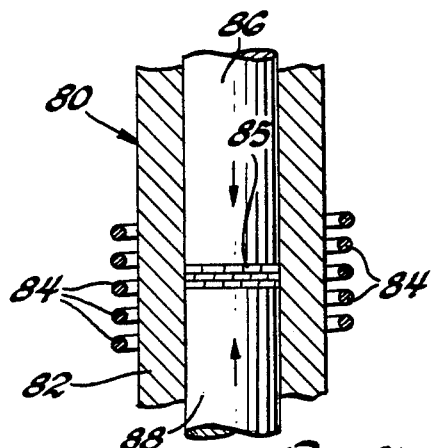

Referring to FIG. 8(c), heating coils 84 are activated until the RE-TM-B alloy softens substantially at a temperature of about 700° C. Top punch 86 and bottom punch 88 are then forced together. Alloy sample 85 fractures and flows in a direction generally perpendicular to the sample's crystallographic c-axis indicated by the arrow.

Simply heating a large grained crystalline RE-TM-B sample to an elevated temperature does not introduce coercivity. However, hot-working results in the creation of significant coercivity and remanence with preferred direction of magnetization transverse to the direction of sample flow. In the preferred practice of the invention, the cast alloy is directionally chilled so as to produce platelet-like grains of $RE_2TM_{14}B$. Directional chilling further tends to produce regions in which the platelets 8' are aligned in the cast block 6'. We much prefer to press (during hot working) in a direction generally parallel to the c-axes of the platelets because pressure in this direction is most effective in introducing coercivity into the magnet. When pressure is applied in the direction perpendicular to the c-axes of the platelets, a much smaller introduction of coercivity is observed.

Coercivity can be induced in overquenched, rapidly solidified (e.g., melt spun) alloy by heating alone. Therefore, the mechanism by which coercivity is introduced into fully crystalline $RE_2TM_{14}B$ alloy by the subject method is different and related to hot working.

Referring to FIG. 8(d), hot pressed alloy 6' is magnetized in suitable equipment shown graphically as 22' after it cools.

EXAMPLE 2

A sample about 6 mm on a side and having the nominal composition $Nd_{16.5}Fe_{76.3}B_{7.2}$ was cut from a billet cast as described in Example 1 above but only about 6 mm thick and the chill mold was made of copper. Most (but not all) of the grains were aligned with their crystallographic c-axes perpendicular to the chill direction (parallel to the primary chill surface).

The sample was positioned in a hot press so its c-axes were preferentially oriented parallel to the direction of pressing. A vacuum was drawn in the press and heating coils were activated to heat the sample to about 725° C. A pressure of about 103 megaPascals (15,000 psi) was exerted on the sample between carbide punches. The cube thickness was reduced by about 50 percent and the sample flowed in a direction transverse to the press direction. The sample was at a temperature above about 700° C. for a total time of about 10 minutes.

The sample was magnetized in a pulsed 100 kOe field. It was magnetized first in the direction parallel to the c-axes, which also was parallel to the direction of pressing.

The magnetic properties of the hot-pressed sample were measured on the Princeton Applied Research vibrating sample magnetometer. Demagnetization curves are shown in FIG. 9. Referring to FIG. 9, the sample was found to have a maximum coercivity of about 6 kOe, a remanence of about 9.6 kGauss, and an energy product of about 15.5 mGOe (curve 90). The sample was then magnetized in the same field but in a direction perpendicular to the c-axes and to the direction of pressing. Curve 92 shows that when so magnetized, the sample had much lower coercivity and remanence. The hot working introduced considerable magnetic anisotropy into the sample as well as coercivity.

The sample had less than 100 Oe coercivity before it was hot-worked.

In conclusion, we have discovered a novel method of hot-working fully crystalline $RE_2TM_{14}B$ alloys to make permanent magnets. The method is much easier to practice and less costly than prior art methods. Hot working randomly oriented, roughly ground, chill-cast particles results in alignment of at least some of the crystallographic c-axes in the direction of pressing transverse to the direction of flow. Directionally solidified alloy can be intentionally worked parallel to the crystallographic c-axis of the $RE_2TM_{14}B$ crystals to insure desired alignment. While heat treating chill cast crystalline ingot induces no magnetic coercivity, simultaneous application of heat and pressure develops significant coercivity. That is, hot-working transforms the crystalline alloy from being magnetically soft to magnetically hard.

While the invention has been described in terms of specific embodiments thereof, other forms may be readily adapted by those skilled in the art. Accordingly, the scope of our invention is to be limited only by the following claims.

The embodiments of the invention in which an exclusive property or privilege is claimed are defined as follows:

1. A method of processing alloys based on rare earth elements, iron and boron to make permanent magnets, the method comprising hot working a magnetically soft crystalline material consisting essential of grains of $RE_2TM_{14}B$ where RE is one or more rare earth elements at least 60 percent of which is neodymium and/or praseodymium, TM is a transition metal at least 60 percent of which is iron, and B is the element boron, which grains have an average length greater than about 5 microns in the direction of the crystallographic c-axis and are separated by an intergranular layer of a material richer in rare earth elements than the $RE_2TM_{14}B$ grains, the material initially having no more than 500 Oe coercivity, said working being carried out at an elevated temperature above the melting temperature of the intergranular phase and at a pressure such that material acquires coercivity in excess of 1000 Oe.

2. A method of processing alloys based on rare earth elements, iron and boron to make permanent magnets, the method comprising working a crystalline magnetically soft material the grains of the principal phase of which are at least about 5 microns along their smallest dimension and which consist essentially of platelets of $RE_2TM_{14}B$ where RE is one or more rare earth elements at least 60 percent of which is neodymium and/or praseodymium, TM is a transition metal at least 60 percent of which is iron, and B is the element boron, which are separated by an intergranular layer of a material richer in rare earth elements than the $RE_2TM_{14}B$ grains, the material initially having no more than 500 Oe coercivity, said working being carried out at an elevated temperature above the melting point of the intergranular phase at a pressure such that material acquires coercivity in excess of 1000 Oe.

3. A method of making an anisotropic permanent magnet comprising
chill casting a molten metal mixture containing rare earth elements, iron and boron in suitable proportions to form a solidified, crystalline magnetically soft alloy having a predominant phase consisting essentially of grains of $RE_2TM_{14}B$ which have an average diameter of at least about 5 microns and where RE is one or more rare earth elements at least 60 percent of which is neodymium and/or praseodymium, TM is a transition metal at least 60 percent of which is iron, and B is the element boron, said grains each having a crystallographic c-axis and which grains are aggregated in regions where such axes are substantially parallel to one another, and a minor second phase between the said grains which is lower melting than the $RE_2TM_{14}B$ phase,
heating said alloy to an elevated temperature above the melting point of the second phase,
mechanically working said alloy and deforming it such that the resulting body upon cooling is magnetically anisotropic and has a permanent magnet characteristics.

4. A method of making an anisotropic permanent magnet comprising
chill casting a molten metal mixture containing rare earth elements, iron and boron in suitable proportions to form a solidified, crystalline magnetically soft alloy having a predominant phase consisting essentially of grains of $RE_2TM_{14}B$ which have an average diameter of at least about 5 microns and where RE is one or more rare earth elements at least 60 percent of which is neodymium and/or praseodymium, TM is a transition metal at least 60 percent of which is iron, and B is the element boron, said grains each having a preferred axis of magnetic orientation along the crystallographic c-axis and which grains are aggregated in regions where such c-axes are substantially parallel to one another, and a minor second phase between the said grains which is relatively richer in rare earth elements than the $RE_2TM_{14}B$ phase,
heating said alloy to an elevated temperature above the melting point of the second phase,
mechanically working said heated alloy and deforming it such that the alloy achieves magnetically hard properties and more grains are aligned with their c-axes parallel to increase magnetic alignment.

5. A method of making an anisotropic permanent magnet comprising chill casting a molten metal mixture containing rare earth elements, iron and boron in suitable proportions to form a fully crystalline, magnetically soft alloy having a predominant phase consisting essentially of packets of grains of $RE_2TM_{14}B$ where RE is one or more rare earth elements at least 60 percent of which is neodymium and/or praseodymium, TM is a transition metal at least 60 percent of which is iron, and B is the element boron, said grains each having a preferred axis of magnetic orientation along their crystallographic c-axes, an average length greater than 5 microns measured along the c-axis, and which grains are aggregated in packets where their crystallographic c-axes are substantially parallel to one another, and a minor second phase between the said grains which is relatively richer in rare earth elements than the $RE_2TM_{14}B$ phase, attriting said alloy to a coarse particles greater than about 50 microns in size which predominantly comprise single packets of grains, enclosing said particles in a malleable container, heating said container and alloy to an elevated temperature to melt the second phase, rolling said heated container to deform it such that the particles are compacted to near 100 percent density and anisotropic permanent magnet characteristics are induced in the alloy.

6. A method of making an anisotropic permanent magnet comprising directionally solidifying a molten metal mixture containing rare earth elements, iron and boron in suitable proportions to form a magnetically soft, crystalline alloy having a predominant phase, grains of said phase having an average diameter of at least about 5 microns and consisting essentially of platelets of $RE_2TM_{14}B$ where RE is one or more rare earth elements at least 60 percent of which is neodymium and/or praseodymium, TM is a transition metal at least 60 percent of which is iron, and B is the element boron, said grains each having a crystallographic c-axis lying perpendicular to the large, flat faces of the platelets and a minor phase between the said grains which is relatively richer in rare earth elements than the $RE_2TM_{14}B$ phase, heating said alloy to an elevated temperature to melt the second phase, and mechanically working said heated alloy such that it flows so as to align the crystallographic c-axes of the grains therein and such that the resulting body upon cooling is magnetically anisotropic and has permanent magnet characteristics.

7. A method of making an anisotropic permanent magnet comprising chill casting a molten metal mixture containing rare earth metals, iron and boron in suitable proportions to form a solidified, magnetically soft, crystalline alloy having a predominant phase consisting essentially of grains of $RE_2TM_{14}B$ having an average diameter of at least about 5 microns where RE is one or more rare earth elements at least 60 percent of which is neodymium and/or praseodymium, TM is a transition metal at least 60 percent of which is iron, and B is the element boron, the grains having crystallographic c-axes and being aggregated in regions where their crystallographic c-axes are substantially parallel to one another, and a minor phase between the said grains which is lower melting than the $RE_2TM_{14}B$ phase, attriting said alloy to coarse particles which predominantly comprise single packets of said grains and are greater than about 50 microns in size, enclosing said particles in a malleable container, heating said container and alloy to an elevated temperature to melt the second phase, and deforming said heated container such that the particles are compacted to near 100 percent density and anisotropic permanent magnet characteristics are induced in the alloy.

8. A method of making an anisotropic permanent magnet comprising directionally solidifying a molten metal mixture containing rare earth elements, iron and boron in suitable proportions to form a solidified, magnetically soft, fully crystalline alloy having a predominant phase consisting essentially of grains of $RE_2TM_{14}B$ where RE is one or more rare earth elements at least 60 percent of which is neodymium and/or praseodymium, TM is a transition metal at least 60 percent of which is iron, and B is the element boron to form large grains which measure at least about 5 microns along their smallest average dimension and a minor phase between the said large grains which is lower melting than the $RE_2TM_{14}B$ phase, heating said alloy to an elevated temperature to melt the second phase, and mechanically working said alloy such that it is deformed, whereby the resulting body upon cooling is magnetically anisotropic and has permanent magnetic characteristics.

9. A method of making an anisotropic permanent magnet comprising directionally solidifying a molten metal mixture containing rare earth elements, iron and boron in suitable proportions to form a solidified, low coercivity alloy having an average grain size of at least 5 microns and a predominant phase consisting essentially of platelets of $RE_2TM_{14}B$ where RE is one or more rare earth elements at least 60 percent of which is neodymium and/or praseodymium, TM is a transition metal at least 60 percent of which is iron, and B is the element boron, said grains each having a crystallographic c-axis lying perpendicular to their faces, and a minor phase between the said grains which is lower melting than the $RE_2TM_{14}B$ phase, heating said alloy to an elevated temperature to melt the second phase, mechanically working said heated alloy such that it flows to align the crystallographic c-axes of the grains therein whereby the resulting body upon cooling has permanent magnetic properties and has a preferred direction of magnetic orientation transverse to said direction of flow.

* * * * *